US008533553B2

(12) United States Patent
Yang et al.

(10) Patent No.: US 8,533,553 B2
(45) Date of Patent: Sep. 10, 2013

(54) METHOD FOR TRANSMITTING INFORMATION OF ACK/NACK SEQUENCE IN WIRELESS COMMUNICATION SYSTEM AND APPARATUS THEREFOR

(75) Inventors: Suckchel Yang, Anyang-si (KR); Jung Hoon Lee, Anyang-si (KR); Joon Kui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 13/147,100

(22) PCT Filed: Dec. 2, 2009

(86) PCT No.: PCT/KR2009/007171
§ 371 (c)(1),
(2), (4) Date: Jul. 29, 2011

(87) PCT Pub. No.: WO2010/140748
PCT Pub. Date: Dec. 9, 2010

(65) Prior Publication Data
US 2011/0283157 A1    Nov. 17, 2011

Related U.S. Application Data

(60) Provisional application No. 61/183,523, filed on Jun. 2, 2009.

(30) Foreign Application Priority Data

Nov. 2, 2009  (KR) .................. 10-2009-0104996

(51) Int. Cl.
*H04L 1/18*    (2006.01)
*G08C 25/02*    (2006.01)

(52) U.S. Cl.
USPC ............................................. 714/748

(58) Field of Classification Search
USPC ............................................. 714/748–749
See application file for complete search history.

(56) References Cited

U.S. PATENT DOCUMENTS

| 7,958,423 | B2 * | 6/2011 | Kim et al. ............... 714/748 |
| 2001/0052091 | A1 | 12/2001 | Goldsack et al. | |
| 2008/0155371 | A1 | 6/2008 | Mauritz et al. | |
| 2009/0046646 | A1 | 2/2009 | Cho et al. | |
| 2010/0146355 | A1 * | 6/2010 | Jiang et al. ............... 714/749 |

FOREIGN PATENT DOCUMENTS

KR    10-2009-0016375 A    2/2009

* cited by examiner

*Primary Examiner* — Shelly A Chase
(74) *Attorney, Agent, or Firm* — Birch, Stewart, Kolasch & Birch, LLP

(57) ABSTRACT

A method for transmitting information of ACK/NACK (Acknowledgement/Negative ACK) sequence from a receiver in a wireless communication system is disclosed. A receiver receives a plurality of data from a transmitter, and determines one ACK/NACK sequence including ACKs/NACKs corresponding to each of the plurality of data. If two or more ACKs are included in the ACK/NACK sequence, the receiver selects a combination of a first HARQ (Hybrid Automatic Repeat reQuest) transmission resource and a first modulation symbol corresponding to a certain ACK of the two or more ACKs, and selects a combination of a second HARQ transmission resource and a second modulation symbol corresponding to ACKs other than the certain ACK of the two or more ACKs. Thus, the receiver transmits each of the first modulation symbol and the second modulation symbol to the transmitter using the first HARQ transmission resource and the second HARQ transmission resource, respectively.

11 Claims, 11 Drawing Sheets

Fig. 1 PRIOR ART
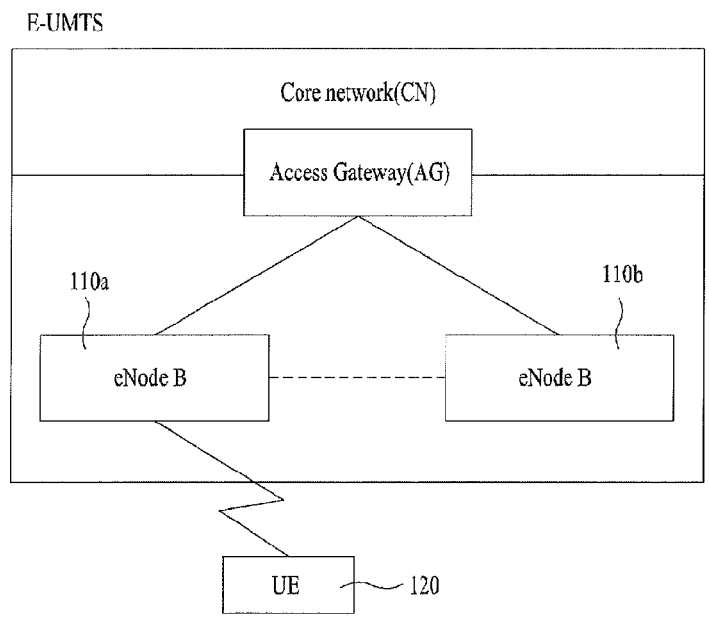
Fig. 2
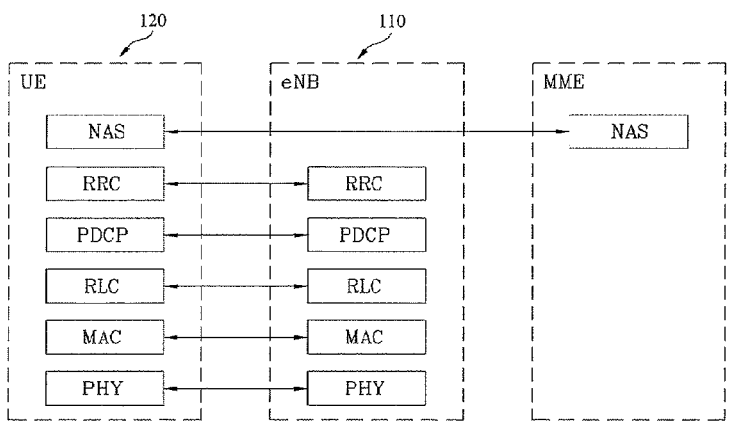
(a) Control-plane protocol stack
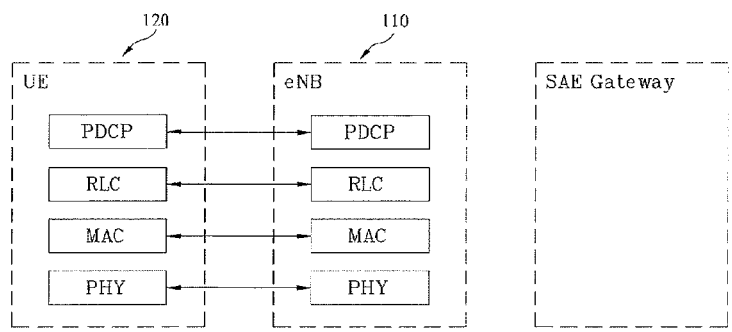
(b) User-plane protocol stack Fig. 7
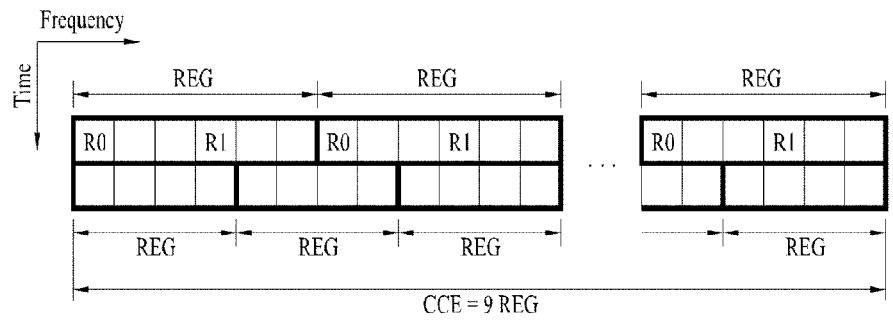
(a) 1 or 2 TX case
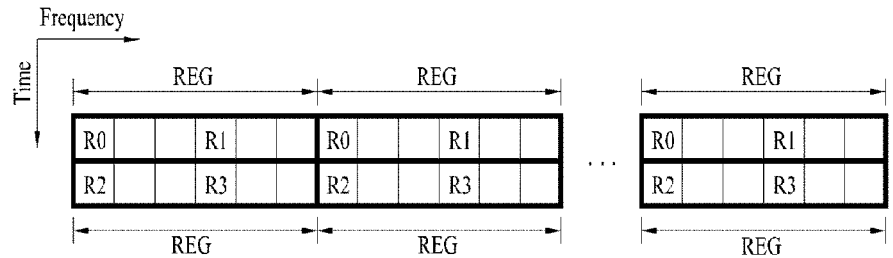
(b) 4 TX case
Fig. 8
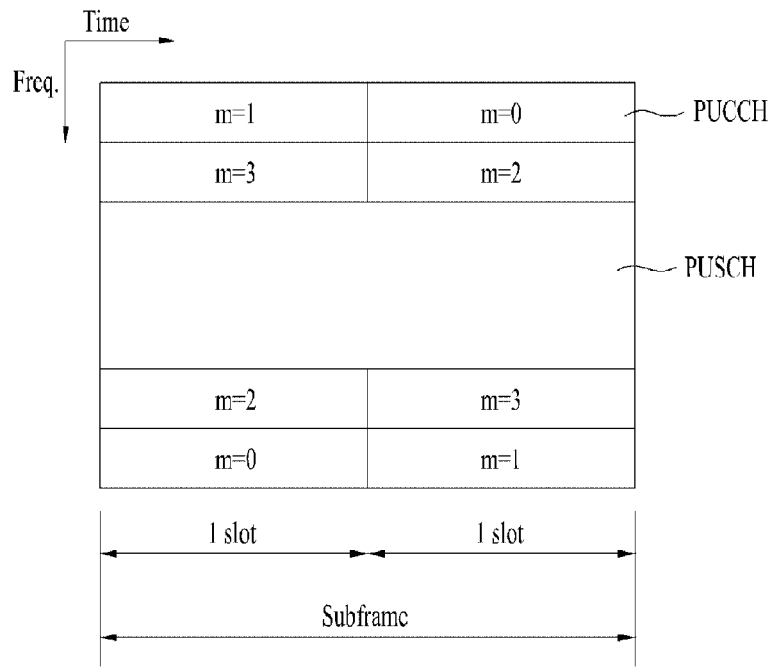

PUCCH format 1a and 1b structure (normal CP case)

Fig. 13

METHOD FOR TRANSMITTING INFORMATION OF ACK/NACK SEQUENCE IN WIRELESS COMMUNICATION SYSTEM AND APPARATUS THEREFOR

This application is the National Phase of PCT/KR2009/007171 filed on Dec. 2, 2009, which claims priority under 35 U.S.C. 119(e) to U.S. Provisional Application No. 61/183,523 filed on Jun. 2, 2009 and under 35 U.S.C. 119(a) to patent application Ser. No. 10-2009-0104996 filed in the Republic of Korea on Nov. 2, 2009, all of which are hereby expressly incorporated by reference into the present application.

TECHNICAL FIELD

The present invention relates to a wireless communication system, and more particularly, to a method for transmitting one ACK/NACK sequence information corresponding to a plurality of data from a receiver of a wireless communication system that receives the plurality of data to a transmitter and an apparatus therefor. The wireless communication system can support at least one of single carrier-frequency division multiple access (SC-FDMA), multi carrier-frequency division multiple access (MC-FDMA), and orthogonal frequency division multiple access (OFDMA). The wireless communication system can also support at least one of frequency division duplex (FDD), half-FDD (H-FDD), and time division duplex (TDD).

BACKGROUND ART

A 3rd generation partnership project long term evolution (3GPP LTE) communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

DISCLOSURE OF INVENTION

Technical Problem

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. A bandwidth of each frequency block can be defined based on a bandwidth of a system block used in the LTE system. Each frequency block is transmitted using a component carrier. Herein, the component carrier may mean a frequency block for carrier aggregation or a center carrier of the frequency block depending on the context. The component carrier and the center carrier may be used together.

Accordingly, the present invention has been devised to substantially obviate one or more problems due to limitations and disadvantages of the related art. An object of the present invention is to provide a method for efficiently transmitting and receiving a signal in a wireless communication system and an apparatus therefor.

Another object of the present invention is to provide a method for efficiently transmitting and receiving a signal in a wireless communication system that uses a plurality of frequency blocks and an apparatus therefor.

Other object of the present invention is to provide a method for transmitting ACK/NACK sequence information corresponding to a plurality of data when a receiver of a wireless communication system receives the plurality of data and an apparatus therefor.

It is to be understood that technical problems to be solved by the present invention are not limited to the aforementioned technical problems and other technical problems which are not mentioned will be apparent from the following description to the person with an ordinary skill in the art to which the present invention pertains.

Solution to Problem

To achieve the aforementioned objects of the present invention, in one aspect of the present invention, a method for transmitting information of ACK/NACK (Acknowledgement/Negative ACK) sequence from a receiver in a wireless communication system comprises receiving a plurality of data from a transmitter; determining one ACK/NACK sequence including ACKs/NACKs corresponding to each of the plurality of data; if two or more ACKs are included in the ACK/NACK sequence, selecting a combination of a first HARQ (Hybrid Automatic Repeat reQuest) transmission resource and a first modulation symbol corresponding to a certain ACK of the two or more ACKs, and selecting a combination of a second HARQ transmission resource and a second modulation symbol corresponding to ACKs other than the certain ACK of the two or more ACKs; and transmitting each of the first modulation symbol and the second modulation symbol to the transmitter using the first HARQ transmission resource and the second HARQ transmission resource, respectively.

The combination of the first HARQ transmission resource and the first modulation symbol includes information of location of the certain ACK in the ACK/NACK sequence. The combination of the second HARQ transmission resource and the second modulation symbol includes information of location and the number of the ACKs other than the certain ACK in the ACK/NACK sequence.

Preferably, the method further comprises, if only one ACK is included in the ACK/NACK sequence, selecting a combination of a third HARQ transmission resource and a third modulation symbol corresponding to the one ACK; and transmitting the third modulation symbol to the transmitter using the third HARQ transmission resource, wherein the third modulation symbol is different from the first modulation symbol and the second modulation symbol.

The combination of the third HARQ transmission resource and the third modulation symbol includes information of location of the one ACK in the ACK/NACK sequence.

In another aspect of the present invention, a method for transmitting information of ACK/NACK sequence, which includes ACKs/NACKs, from a receiver in a wireless communication system, comprises selecting a combination of a first HARQ (Hybrid Automatic Repeat reQuest) transmission resource and a first modulation symbol and a combination of a second HARQ transmission resource and a second modulation symbol, corresponding to the ACK/NACK sequence; and transmitting each of the first modulation symbol and the second modulation symbol to a transmitter using the first HARQ transmission resource and the second HARQ transmission resource, respectively.

In other aspect of the present invention, a receiving apparatus in a wireless communication system comprises a receiving module receiving a plurality of data from a transmitting apparatus; a processor determining one ACK/NACK sequence, which includes ACKs/NACKs corresponding to the plurality of data, if two or more ACKs are included in the ACK/NACK sequence, selecting a combination of a first HARQ (Hybrid Automatic Repeat reQuest) transmission resource and a first modulation symbol corresponding to a certain ACK of the two or more ACKs, and selecting a combination of a second HARQ transmission resource and a second modulation symbol corresponding to the ACKs other than the certain ACK of the two or more ACKs; and a transmitting module transmitting each of the first modulation symbol and the second modulation symbol to the transmitting device using the first HARQ transmission resource and the second HARQ transmission resource, respectively.

The combination of the first HARQ transmission resource and the first modulation symbol includes information of location of the certain ACK in the ACK/NACK sequence. Further, the combination of the second HARQ transmission resource and the second modulation symbol includes information of location and the number of the ACKs other than the certain ACK in the ACK/NACK sequence.

Preferably, the processor, if only one ACK is included in the ACK/NACK sequence, selects a combination of a third HARQ transmission resource and a third modulation symbol corresponding to the ACK/NACK sequence, and the transmitting module transmits the third modulation symbol to a transmitter using the third HARQ transmission resource, the third modulation symbol being different from the first modulation symbol and the second modulation symbol.

Also, the combination of the third HARQ transmission resource and the third modulation symbol includes information of location of the one ACK in the ACK/NACK sequence.

Advantageous Effects of Invention

According to the embodiments of the present invention, the following advantages can be obtained.

First of all, a method for efficiently transmitting and receiving a signal in a wireless communication system and an apparatus therefor can be provided.

Second, a method for efficiently transmitting and receiving a signal in a wireless communication system that uses a plurality of frequency blocks and an apparatus therefor can be provided.

Third, when a receiver of a wireless communication system receives a plurality of data, a method for transmitting ACK/NACK sequence information corresponding to the plurality of data and an apparatus therefor can be provided.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating a network structure of an Evolved Universal Mobile Telecommunications System (E-UMTS) which is an example of a mobile communication system;

FIG. 2 is a diagram illustrating structures of a control plane and a user plane of a radio interface protocol between one user equipment and E-UTRAN based on the 3GPP radio access network standard;

FIG. 7 is a conceptional diagram illustrating a resource unit of a control channel in an LTE system;

FIG. 8 is a diagram illustrating a structure of an uplink subframe used in an LTE system;

FIG. 13 is an exemplary view for application of a method of multiplexing ACK/NACK according to another embodiment of the present invention;

MODE FOR THE INVENTION

Figure 3:
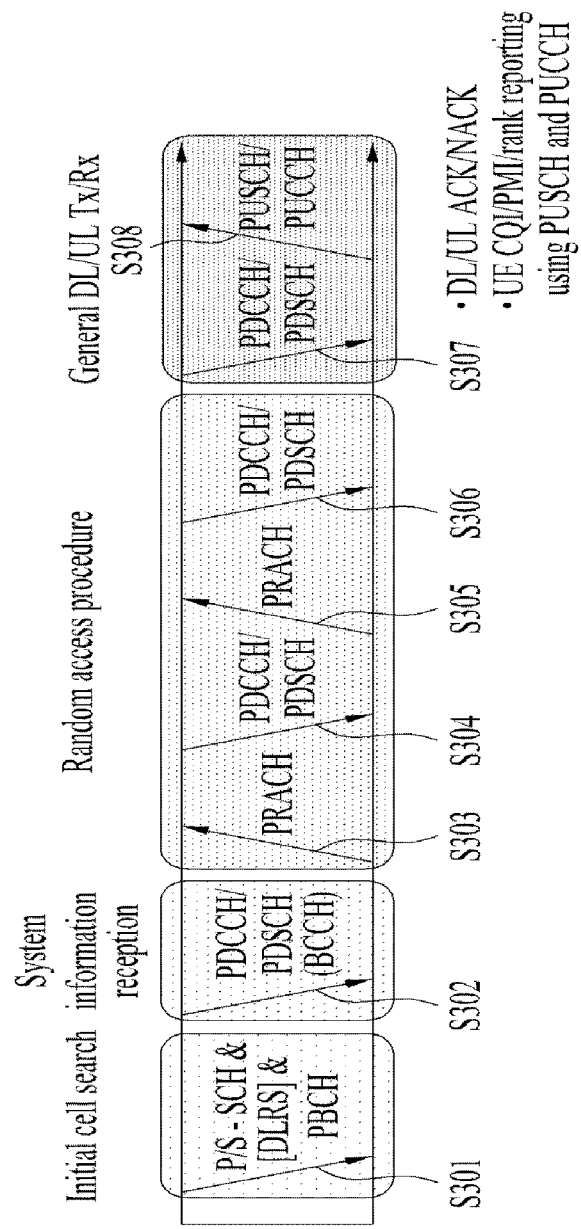
FIG. 3 is a diagram illustrating physical channels used in a 3GPP system and a method for transmitting a general signal using the physical channel.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single frequency block will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as that of the system block of the legacy system. On the other hand, there is no limitation in sizes of the other frequency blocks. However, for system simplification, the sizes of the other frequency blocks may be determined based on the size of the system block of the legacy system. For example, the 3GPP LTE (Release-8) system and the 3GPP LTE-A (Release-9) system are evolved from the legacy system.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary and the embodiment of the present invention can easily be applied to H-FDD mode or TDD mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

The physical layer as the first layer provides an information transfer service to an upper layer using a physical channel. The physical layer (PHY) is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

FIG. 3 is a diagram illustrating physical channels used in a 3GPP system and a method for transmitting a general signal using the physical channel.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a random physical random access channel (PRACH) (S303 and S305), and receives a response message to the preamble through the PDCCH and a PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as a procedure of transmitting general uplink/downlink signals. The control information transmitted from the user equipment to the base station or received from the base station to the user equipment through the uplink includes downlink/uplink ACK/NACK, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

Figure 4:
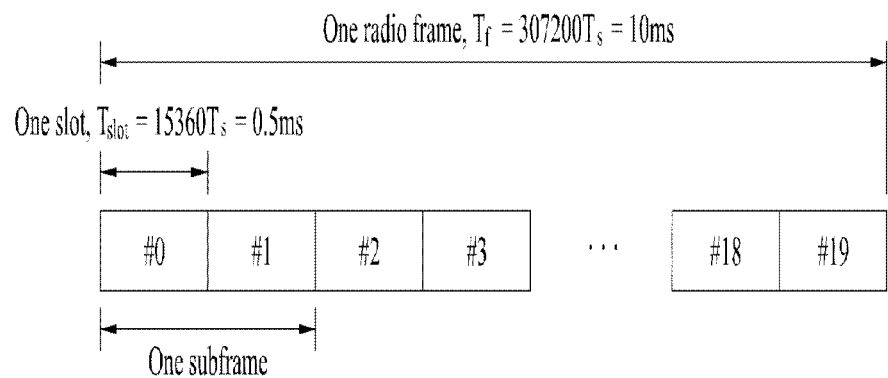
FIG. 4 is a diagram illustrating a structure of a radio frame used in an LTE system.

FIG. 4 is a diagram illustrating a structure of a radio frame used in the LTE system.

Referring to FIG. 4, the radio frame has a length of 10 ms(327200*Ts) and includes 10 subframes of an equal size. Each sub frame has a length of 1 ms and includes two slots. Each slot has a length of 0.5 ms(15360*$T_s$). In this case, $T_s$ represents a sampling time, and is expressed by $T_s=1/(15 kHz \times 2048)=3.2552 \times 10-8$(about 33 ns). The slot includes a plurality of OFDM symbols in a time region, and includes a plurality of resource blocks (RBs) in a frequency region. In the LTE system, one resource block includes twelve (12) subcarriers×seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
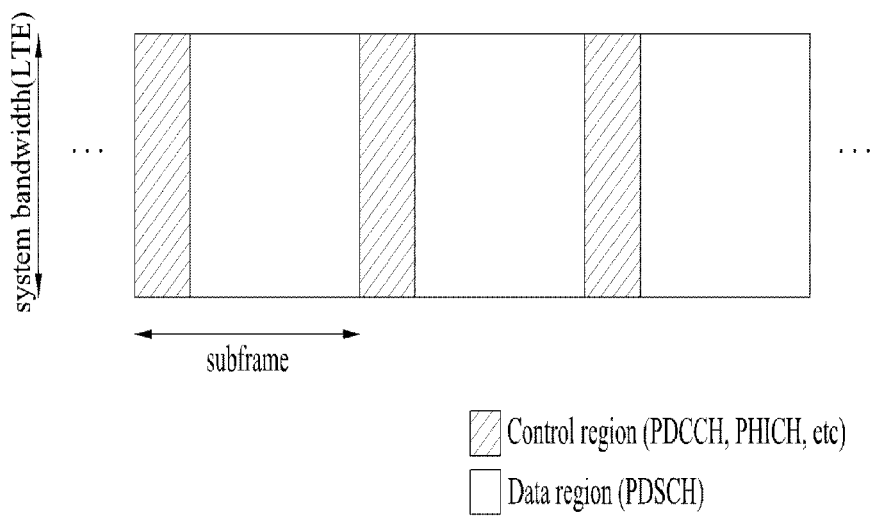
FIG. 5 is a diagram illustrating a structure of a downlink radio frame used in an LTE system.

FIG. 5 is a diagram illustrating a structure of a downlink radio frame used in an LTE system.

Referring to FIG. 5, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control information and a data region for transmission of downlink data. The control region starts from the first OFDM symbol of the subframe and includes one or more OFDM symbols. The control region can have a size set independently per subframe. The control region is used to transmit L1/L2(layer 1/layer 2) control signals. The data region is used to transmit downlink traffic.

Figure 6:
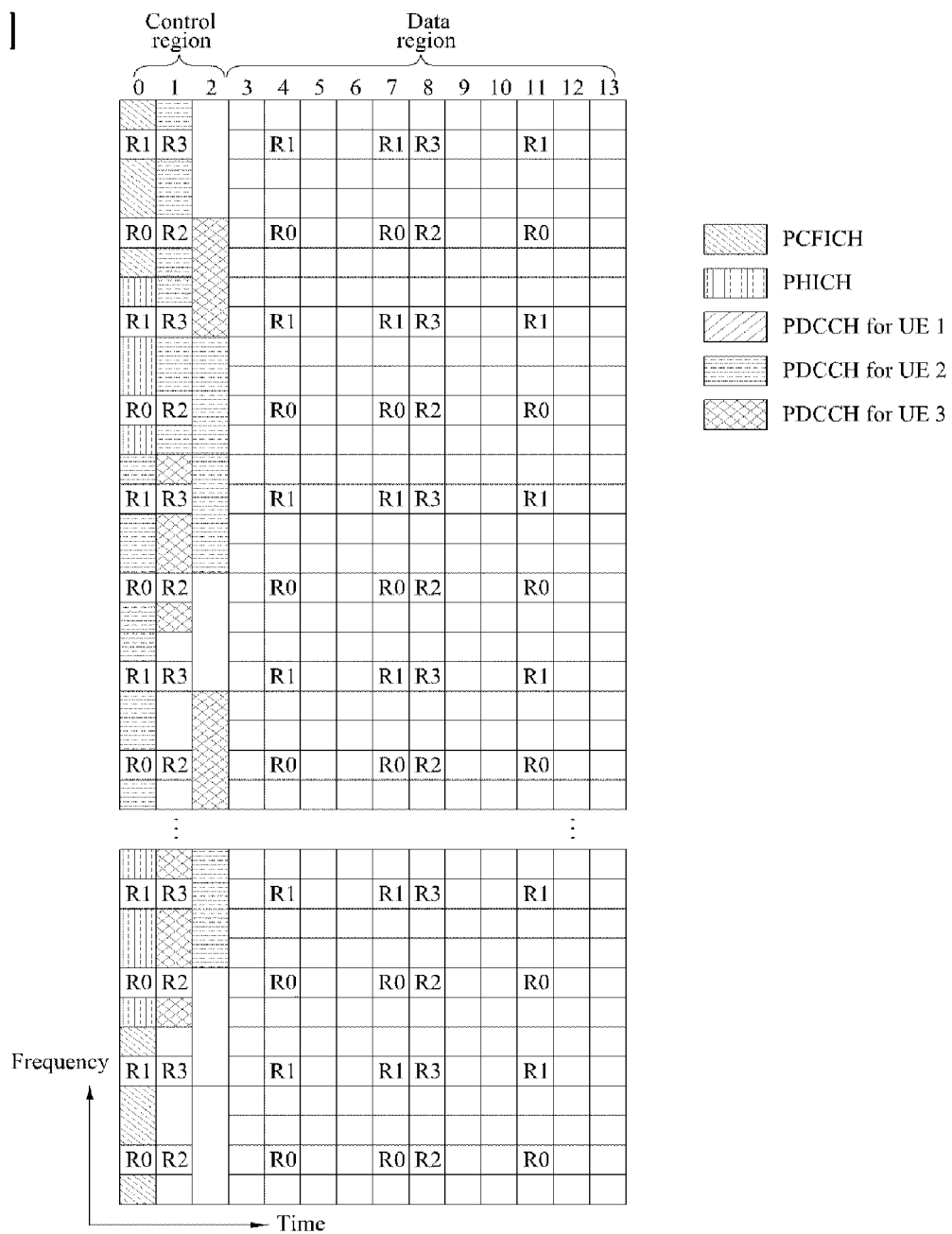
FIG. 6 is a diagram illustrating a control channel included in a control region of one subframe in a downlink radio frame.

FIG. 6 is a diagram illustrating an example of a control channel included in a control region of a subframe in a downlink radio frame.

Referring to FIG. 6, the subframe includes fourteen (14) OFDM symbols. First one to three OFDM symbols are used as the control region in accordance with establishment of subframe, and the other thirteen to eleven OFDM symbols are used as the data region. In FIG. 6, R1 to R4 represent reference signals (RS) or pilot signals of antennas 0 to 3. The RS is fixed by a given pattern within the subframe regardless of the control region and the data region. The control channel is allocated to a resource to which the RS is not allocated in the control region, and the traffic channel is also allocated to a resource to which the RS is not allocated in the data region. Examples of the control channel include PCFICH (Physical Control Format Indicator CHannel), PHICH (Physical Hybrid-ARQ Indicator CHannel), and PDCCH (Physical Downlink Control CHannel).

The PCFICH notifies the user equipment of the number of OFDM symbols used in the PDCCH per subframe. The PCFICH is located in the first OFDM symbol and established prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The structure of the REG will be described in detail with reference to FIG. 7. The PCFICH value indicates a value of 1 to 3 or a value of 2 to 4 depending on a bandwidth, and is modulated by Quadrature Phase Shift Keying (QPSK).

The PHICH is a physical hybrid-automatic repeat request (HARQ) indicator channel and is used to transmit HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are spread by a spreading factor (SF)=2 or 4. A plurality of PHICHs can be mapped with the same resource and constitute a PHICH group. The number of PHICHs multiplexed in the PHICH group is determined by the number of spreading codes. The PHICH group is repeated three times to obtain diversity gain in the frequency region and/or the time region.

The PDCCH is allocated to first n number of OFDM symbols of the subframe, wherein n is an integer greater than 1 and is indicated by the PCIFCH. The PDCCH includes one or more CCEs, which will be described in detail later. The PDCCH notifies each user equipment or user equipment group of information related to resource allocation of transport channels, i.e., a paging channel (PCH) and a downlink-shared channel (DL-SCH), uplink scheduling grant, HARQ information, etc. The PCH and the DL-SCH are transmitted through the PDSCH. Accordingly, the base station and the user equipment respectively transmit and receive data through the PDSCH except for specific control information or specific service data. Information as to user equipment(s)

(one user equipment or a plurality of user equipments) to which data of the PDSCH are transmitted, and information as to how the user equipment(s) receives and decodes PDSCH data are transmitted through the PDCCH. For example, it is assumed that a specific PDCCH is CRC masked with radio network temporary identity (RNTI) "A," and information of data transmitted using a radio resource (for example, frequency location) "B" and transmission format information (for example, transport block size, modulation mode, coding information, etc.) "C" is transmitted through a specific subframe. In this case, one or more user equipments located in a corresponding cell monitor the PDCCH using their RNTI information, and if there are one or more user equipments having RNTI "A", the user equipments receive the PDCCH, and receive the PDSCH indicated by "B" and "C" through information of the received PDCCH.

FIG. 7 is a conceptional diagram illustrating a resource unit of a control channel in an LTE system. Specifically, FIG. 7(a) illustrates that the number of transmitting antennas is 1 or 2, and FIG. 7(b) illustrates that the number of transmitting antennas is 4. In FIG. 7(a) and FIG. 7(b), different reference signal patterns are illustrated depending on the number of transmitting antennas but a method of establishing a resource unit related to a control channel is illustrated equally.

Referring to FIG. 7, a basic resource unit of the control channel is REG. The REG includes four neighboring resource elements (REs) excluding the reference signals. The REG is illustrated with a solid line. The PCFIC and the PHICH include four REGs and three REGs, respectively. The PDCCH is configured in a unit of CCE, one CCE including nine REGs.

The user equipment is established to identify $M^{(L)}(\geqq L)$ number of CCEs arranged continuously or arranged by a specific rule, whereby the user equipment can identify whether the PDCCH of L number of CCEs is transmitted thereto. A plurality of L values can be considered by the user equipment to receive the PDCCH. CCE sets to be identified by the user equipment to receive the PDCCH will be referred to as a PDCCH search space. For example, the LTE system defines the PDCCH search space as expressed in Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, |
| | 2 | 12 | 6 | 1B, 2 |
| | 4 | 8 | 2 | |
| | 8 | 16 | 2 | |
| Common | 4 | 16 | 4 | 0, 1A, 1C, |
| | 8 | 16 | 2 | 3/3A |

In Table 1, L represents the number of CCEs constituting the PDCCH, $S_k^{(L)}$ represents a PDCCH search space, and $M^{(L)}$ represents the number of PDCCH candidates to be monitored in the search space.

The PDCCH search space can be divided into a UE-specific search space that allows access to only a specific user equipment and a common search space that allows access to all user equipments within a cell. The user equipment monitors a common search space in L=4 and 8, and monitors a UE-specific search space in L=1, 2, 4 and 8. The common search space and the UE-specific search space can be overlapped with each other.

Furthermore, in the PDCCH search space given to a certain user equipment for each L value, the location of the first CCE (i.e., CCE having the smallest index) is varied per subframe depending on the user equipment. This will be referred to as a PDCCH search space hashing.

FIG. 8 is a diagram illustrating a structure of an uplink subframe used in an LTE system.

Referring to FIG. 8, the uplink subframe includes a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency region are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH undergo frequency hopping in the boundary of the slots. Particularly, FIG. 8 exemplarily illustrates that PUCCH of m=0, PUCCH of m=1, PUCCH of m=2, and PUCCH of m=3 are allocated to the subframe.

Figure 9:
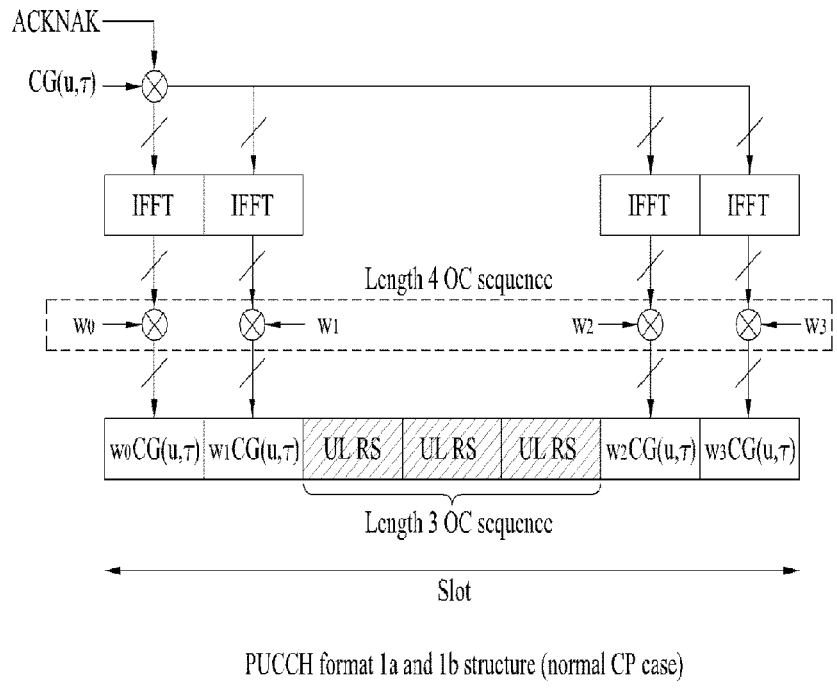
FIG. 9 is a diagram illustrating a structure of a PUCCH 1a/1b for ACK/NACK transmission in an LTE system.

FIG. 9 is a diagram illustrating a PUCCH format 1a/1b structure for ACK/NACK transmission in an LTE system.

Referring to FIG. 9, in case of a normal cyclic prefix (CP), a slot includes seven SC-FDMA symbols. A reference signal is carried in three successive SC-FDMA symbols located in the center of the slot, and ACK/NACK is carried in the other four SC-FDMA symbols. In case of an extended CP, the slot includes six SC-FDMA symbols, wherein a reference signal is carried in the third and fourth SC-FDMA symbols.

Resources for ACK/NACK transmission are identified using different cyclic shifts (CS) (frequency spreading) of computer generated constant amplitude zero auto correlation (CG-CAZAC) sequence and different Walsh/DFT orthogonal codes (time spreading). w0, w1, w2, w3 multiplied after IFFT obtain the same result even though they are multiplied before IFFT. Resource blocks for ACK/NACK transmission are allocated to be orthogonal to each other in the frequency region.

Supposing that available cyclic shifts are six and available Walsh/DFT codes are three, eighteen user equipments can be multiplexed into one resource block. In the LTE system, PUCCH resource for ACK/NACK transmission is indicated by index representing a pair of cyclic shift and orthogonal code. Also, in the present invention, a resource for uplink HARQ means a PUCCH resource.

Hereinafter, a general method of transmitting ACK/NACK in an uplink of an LTE system will be described in more detail.

In the case that a transmitter transmits data to a receiver, the receiver performs a decoding process of the data. If the decoding process of the data is successfully performed, the receiver transmits ACK to the transmitter. If the decoding process of the data is failed, the receiver transmits NACK to the transmitter. Also, the transmitter may transmit a plurality of data within the range of allocated resources (for example, frequency, time, code, etc.), and the receiver may also transmit a plurality of data within the range of allocated resources. Basically, ACK/NACK transmission of each of data corresponds to one HARQ transmission resource. However, the transmitter may transmit a plurality of data under a specific circumstance (for example, TDD). In this case, the receiver should transmit ACK/NACK equivalent to the number of the plurality of data to the transmitter. Accordingly, a problem occurs in that much power consumption is required for ACK/NACK transmission. According to the related art, ACK/NACK bundling and ACK/NACK multiplexing has been suggested to solve the above problem.

First of all, ACK/NACK bundling means that ACK/NACK of a plurality of data are combined with one another by logical AND operation. For example, ACK transmission is performed only if the receiver successfully decodes all data. In other case, NACK transmission is performed or no signal is transmitted.

ACK/NACK multiplexing means that ACK/NACK of a plurality of data, i.e., ACK/NACK sequence is mapped to combination of Quadrature Phase Shift Keying (QPSK) symbols and HARQ transmission resources for ACK/NACK transmission. The following Table 2 is a table for mapping ACK/NACK sequence of two data, and is disclosed in LTE standard TS 36.213 Table 10.1-2.

Referring to Table 2, $n^{(1)}_{PUCCH}$ is index of HARQ transmission resources for ACK/NACK transmission, and b(0),b(1) are ACK/NACK data bits corresponding to the received data. Also, HARQ-ACK(i) means ACK/NACK of the ith data unit, and DTX (Discontinuous Transmission) is a signal corresponding to a case where there are no data corresponding to HARQ-ACK(i) or a case where the receiver fails to detect data corresponding to HARQ-ACK(i).

TABLE 2

| HARQ-ACK(0), HARQ-ACK(1) | $n^{(1)}_{PUCCH}$ | b(0), b(1) |
| --- | --- | --- |
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

If the receiver receives two data and successfully decodes them, it maps ACK/NACK (1,1) to QPSK modulation symbols and transmits the corresponding data to the transmitter using a resource corresponding to $n^{(1)}_{PUCCH,1}$. Also, although the receiver receives two data, if it fails to decode the first data and successfully decodes the second data, it maps ACK/NACK (0,0) with QPSK modulation symbols and transmits the corresponding data to the transmitter using a resource corresponding to $no^{(1)}_{PUCCH,1}$. Such ACK/NACK multiplexing can be applied to even a case where the receiver receives a larger number of data. Particularly, tables applicable to three data and four data are respectively disclosed in LTE standard TS 36.213 Table 10.1-3 and Table 10.1-4.

Referring to Table 1 in more detail, if ACK does not exist in ACK/NACK sequence, i.e., if NACK and DTX only exist in ACK/NACK sequence, NACK and DTX are considered respectively. On the other hand, if at least one ACK exists in ACK/NACK sequence, since all number of cases cannot be reflected by only combination of QPSK modulation symbols and HARQ transmission resources, it is noted that NACK is combined with DTX. This is because that one HARQ transmission resource corresponds to ACK/NACK sequence.

As described above, if the number of data that can be transmitted using a given resource increases, for example, in case of application spatial multiplexing due to multiple antennas and carrier aggregation, number of cases of ACK/NACK/DTX required for ACK/NACK multiplexing increase exponentially. Specifically, if the number of data is N and the number of HARQ transmission resources is $N_A$, $2^N$ ACK/NACK sequences exist, even excluding DTX signal. In this case, if only one HARQ transmission resource corresponds to ACK/NACK sequence as described above, $4N_A$ number of ACK/NACK sequences can be applied to the conventional ACK/NACK multiplexing in view of QPSK modulation. Accordingly, in order to support all ACK/NACK sequences, $2^N/4$ HARQ transmission resources are required. For example, in order to all ACK/NACK sequences corresponding to five data, $2^5/4=8$ HARQ transmission resources are required.

In order to solve the above problem, a new ACK/NACK multiplexing method will be suggested hereinafter. First of all, it is assumed that all HARQ transmission resources are split from one another in view of frequency, time, space, and code, and thus are orthogonal to one another or have low relationship with one another. In the ACK/NACK multiplexing method of the present invention, ACK/NACK sequence including only one ACK and ACK/NACK sequence including only one NACK split from the DTX signal are first transmitted by selecting only one HARQ transmission resource.

In other case, ACK/NACK sequence that includes at least two ACKs is transmitted by 1) selecting one or plurality of HARQ transmission resources or 2) selecting only a plurality of HARQ transmission resources. Hereinafter, the aforementioned two methods will be described in more detail. Also, HARQ transmission resource for ACK/NACK transmission will simply be expressed as A/N UNIT in the drawings.

<First Embodiment>

Figure 10:
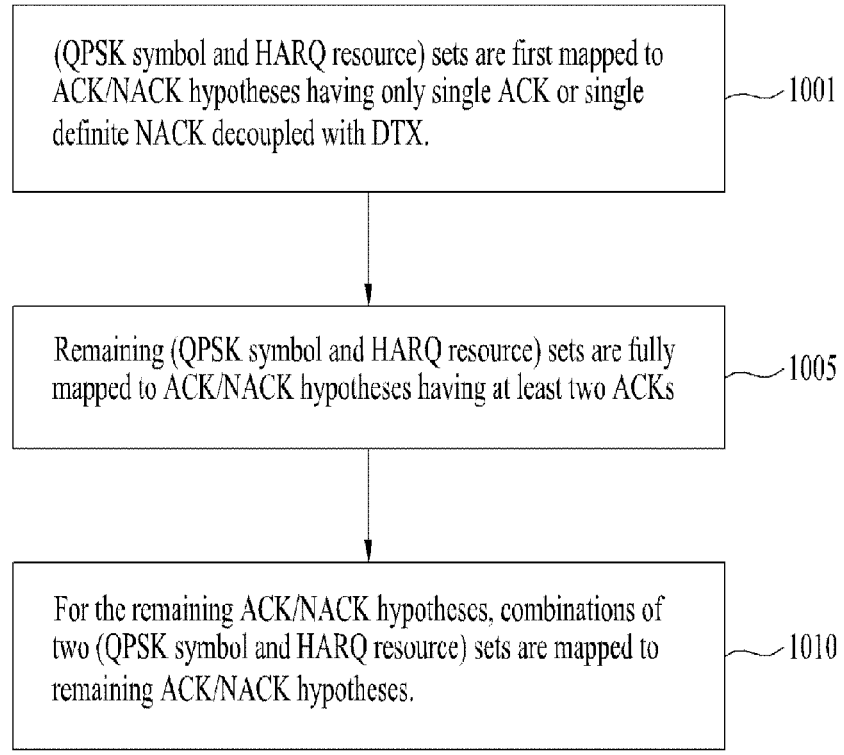
FIG. 10 is a flow chart illustrating a method of multiplexing ACK/NACK according to one embodiment of the present invention.

FIG. 10 is a flow chart illustrating a method of multiplexing ACKs/NACKs according to one embodiment of the present invention.

Figure 11:
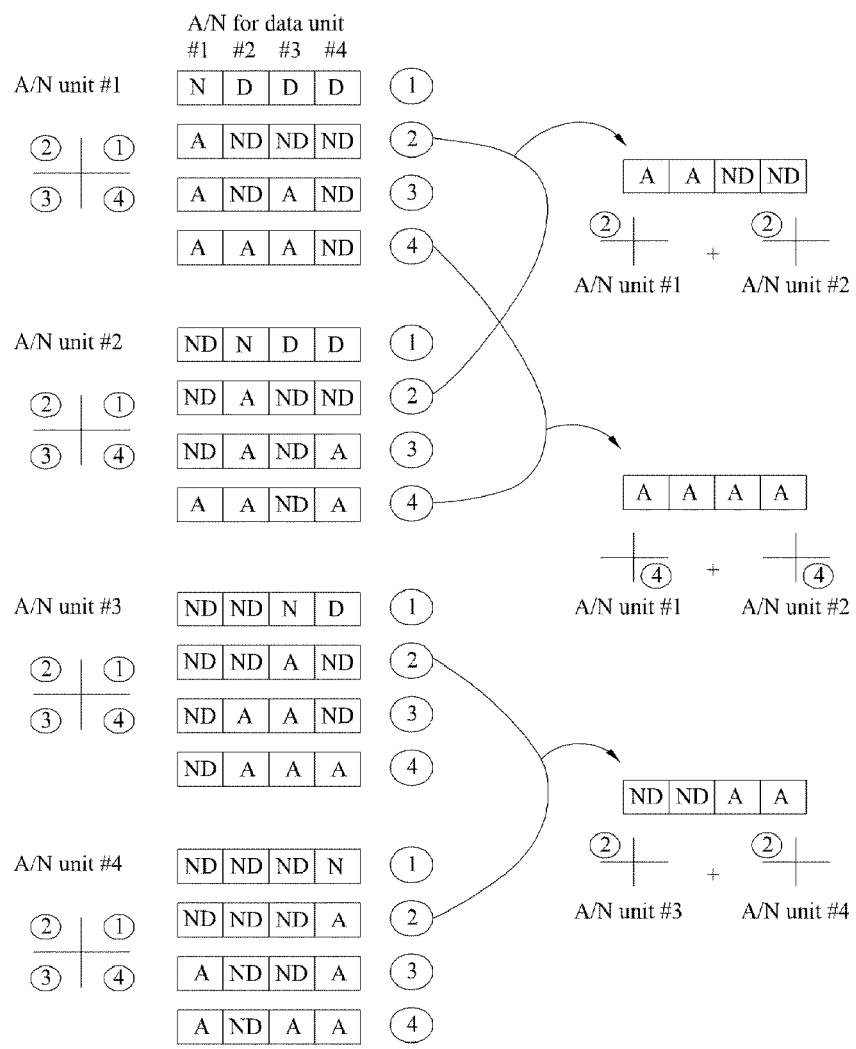
FIG. 11 is an exemplary view of a table for application of a method of multiplexing ACK/NACK according to one embodiment of the present invention.

Also, FIG. 11 is an exemplary view of a table for applying a method of multiplexing ACKs/NACKs according to one embodiment of the present invention. Particularly, in FIG. 11, it is assumed that there are provided four data and four HARQ transmission resources for ACK/NACK sequence transmission, wherein 2-bit modulation symbol using QPSK modulation corresponds to each HARQ transmission resource. Also, "A", "N", "ND" and "D" respectively mean ACK, NACK, NACK/DTX and DTX, and "1", "2", "3" and "4" mean QPSK modulation symbols.

Moreover, in order to reduce an error that may occur when ACK is changed to NACK or vice versa, ACK/NACK sequence is preferably mapped to modulation symbol transmitted using each HARQ transmission resource in accordance with a gray coding format.

Referring to FIG. 10 and FIG. 11, in step 1001, ACK/NACK sequence including only one ACK and ACK/NACK sequence including only one NACK split from DTX signal are respectively mapped to one HARQ transmission resource and two QPSK modulation symbols corresponding to the HARQ transmission resource. For example, in FIG. 11, ACK/NACK sequence including only one NACK split from DTX signal is mapped to each modulation symbol "1" of HARQ transmission resources, and ACK/NACK sequence including only one ACK is mapped to modulation symbol "2".

Specifically, only one NACK split from DTX signal exists in ACK/NACK sequence "ND+N+D+D", wherein the ACK/NACK sequence "ND+N+D+D" is mapped to modulation symbol "1" of HARQ transmission resource #2. Likewise, only one ACK exists in ACK/NACK sequence "ND+A+ND+ND", wherein the ACK/NACK sequence "ND+A+ND+ND" is mapped to modulation symbol "2" of HARQ transmission resource #2.

Next, in step 1005, ACK/NACK sequences including at least two ACKs are sequentially allocated to modulation symbols remaining after allocated in step 1000. In this case, as described above, in order to reduce an error that may occur when ACK is changed to NACK or vice versa, modulation symbol transmitted using each HARQ transmission resource is preferably mapped in accordance with a gray coding format.

For example, as illustrated in FIG. 11, the ACK/NACK sequences "ND+A+ND+A" and "A+A+ND+A" are respectively mapped to modulation symbols "3" and "4" of HARQ transmission resource #2. Particularly, in the ACK/NACK sequence "ND+A+ND+A" mapped to modulation symbol "3" and the ACK/NACK sequence "A+A+ND+A" mapped to modulation symbol "4", only the first ACK/NACK included the ACK/NACK sequences is mapped in accordance with a modified gray coding format.

Finally, in step 1010, the other ACK/NACK sequences are allocated to two HARQ transmission resources and each modulation symbol of the two HARQ transmission resources. In the example of FIG. 11, since the ACK/NACK sequences "A+A+ND+ND", "A+A+A+A" and "ND+ND+A+A" are the other ACK/NACK sequences to which are not mapped, they are allocated the two HARQ transmission resources and each modulation symbol of the two HARQ transmission resources.

Specifically, modulation symbol "4" of HARQ transmission resource #1 and modulation symbol "4" of HARQ transmission resource #2 are mapped to the ACK/NACK sequence "A+A+A+A" as illustrated in FIG. 11.

<Second Embodiment>

Figure 12:
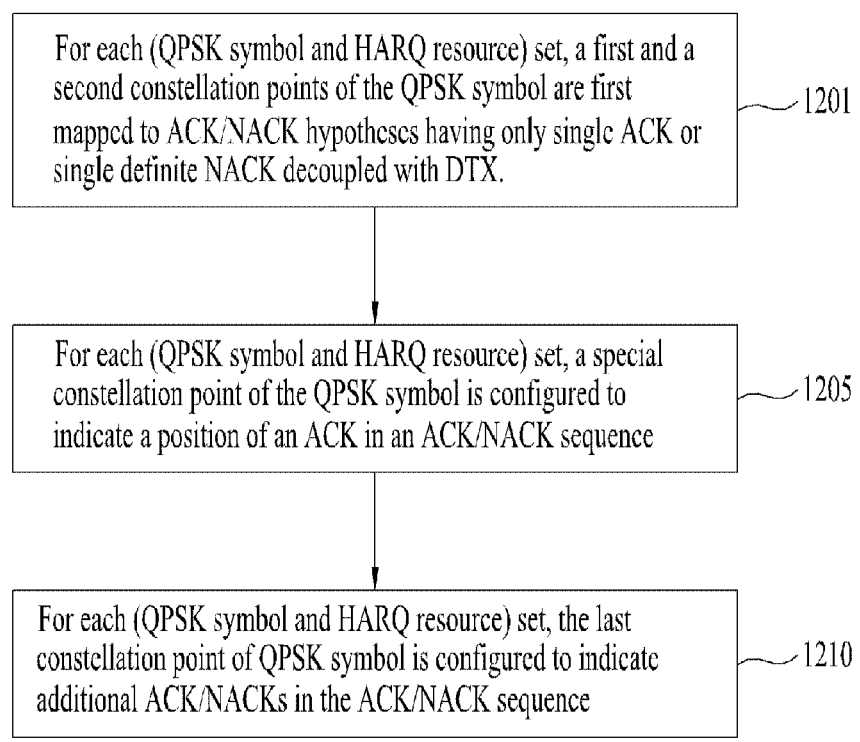
FIG. 12 is a flow chart illustrating a method of multiplexing ACK/NACK according to another embodiment of the present invention.
Figure 13:
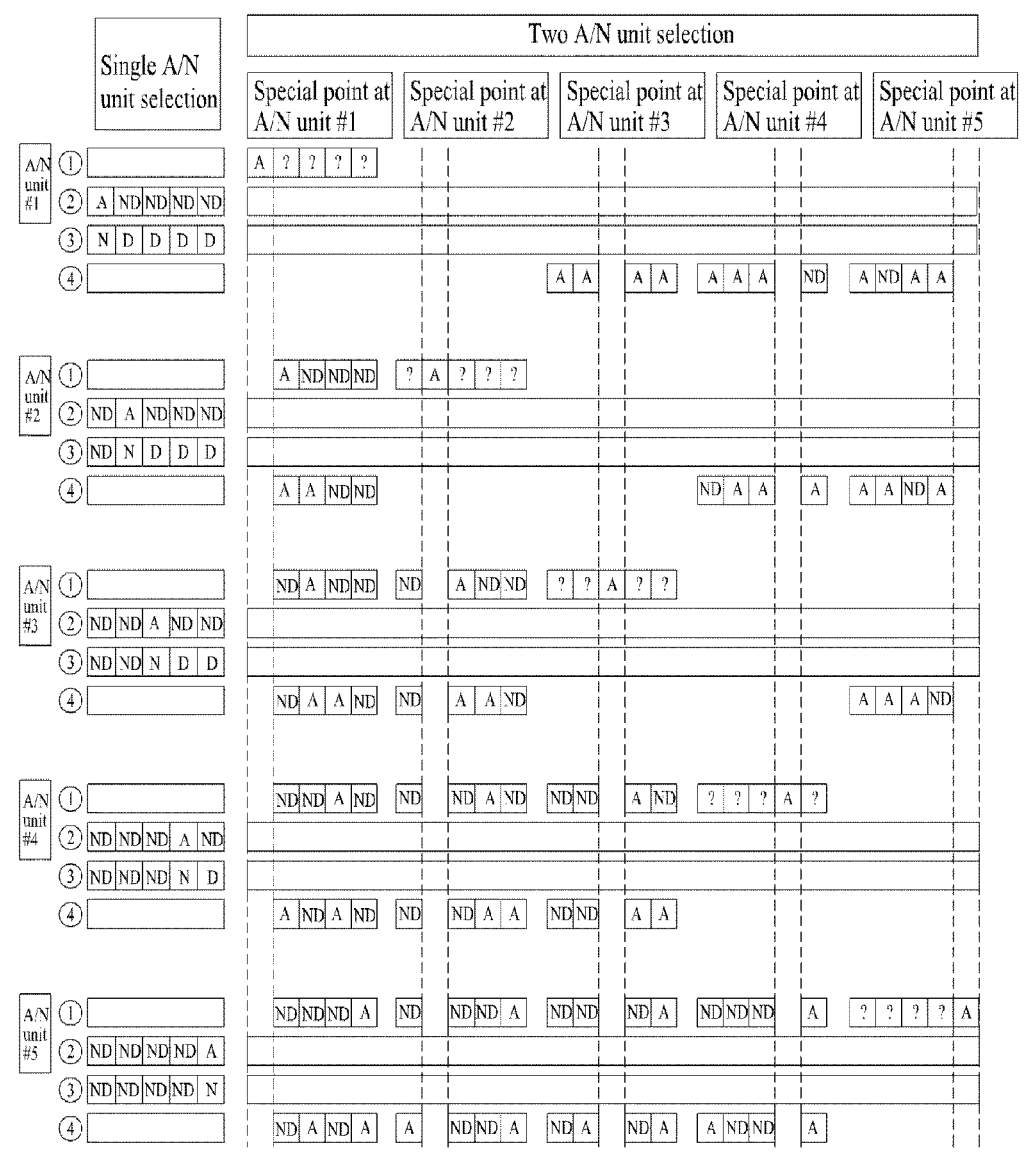

FIG. 12 is a flow chart illustrating a method of multiplexing ACKs/NACKs according to another embodiment of the present invention. FIG. 13 is an exemplary view for application of a method of multiplexing ACKs/NACKs according to another embodiment of the present invention. Particularly, in FIG. 13, it is assumed that there are provided five data and five HARQ transmission resources for ACK/NACK sequence transmission. Further, "A", "N", "ND" and "D" respectively mean ACK, NACK, NACK/DTX and DTX, and "1", "2", "3" and "4" mean QPSK modulation symbols.

Referring to FIG. 12 and FIG. 13, in step 1201, ACK/NACK sequence including only one ACK and ACK/NACK sequence including only one NACK split from DTX signal are respectively mapped to HARQ transmission resource and two QPSK modulation symbols corresponding to the HARQ transmission resource. Namely, step 1201 is the same process as the step 1001 of FIG. 10.

For example, in FIG. 13, ACK/NACK sequence including only one ACK is mapped to modulation symbol "2" of each HARQ transmission resource, and ACK/NACK sequence including only one NACK split from DTX signal is mapped to modulation symbol "3" of each HARQ transmission resource. Specifically, only one ACK exists in ACK/NACK sequence "ND+ND+A+ND+ND", wherein the ACK/NACK sequence "ND+ND+A+ND+ND" is mapped to modulation symbol "2" of HARQ transmission resource #3. Likewise, only one NACK split from DTX signal exists in ACK/NACK sequence "ND+ND+N+D+D", wherein the ACK/NACK sequence "ND+ND+N+D+D" is mapped to modulation symbol "3" of HARQ transmission resource #3.

Next, the other ACK/NACK sequences, i.e., ACK/NACK sequences including at least two ACKs are transmitted using two HARQ transmission resources. In more detail, in step 1205, information indicating location of a certain ACK included in ACK/NACK sequence is mapped to a combination of modulation signal and HARQ transmission resource. For example, in FIG. 13, modulation signal "1" of each HARQ transmission resource indicates location of a certain ACK in ACK/NACK sequence including at least two or more ACKs.

Also, in step 1210, information of type and order of ACKs/NACKs other than the certain ACK is mapped to modulation signal of other HARQ transmission resource. In FIG. 13, modulation symbol "4" of each HARQ transmission resource includes information of type and order of ACKs/NACKs other than the certain ACK.

Specifically, ACK/NACK sequence "A+ND+A+A+ND" transmits modulation signal "1" using HARQ transmission resource #1 to indicate that ACK is located in the first location, and also transmits modulation signal "4" to the transmitter using HARQ transmission resource #3 to indicate type and order of the other ACKs/NACKs, i.e., "ND+A+A+ND".

Also, it is preferable that modulation symbols allocated to ACK/NACK sequence including only one ACK or only one NACK split from DTX signal are exclusive from modulation symbols allocated to ACK/NACK sequence including at least two or more ACKs.

Figure 14:
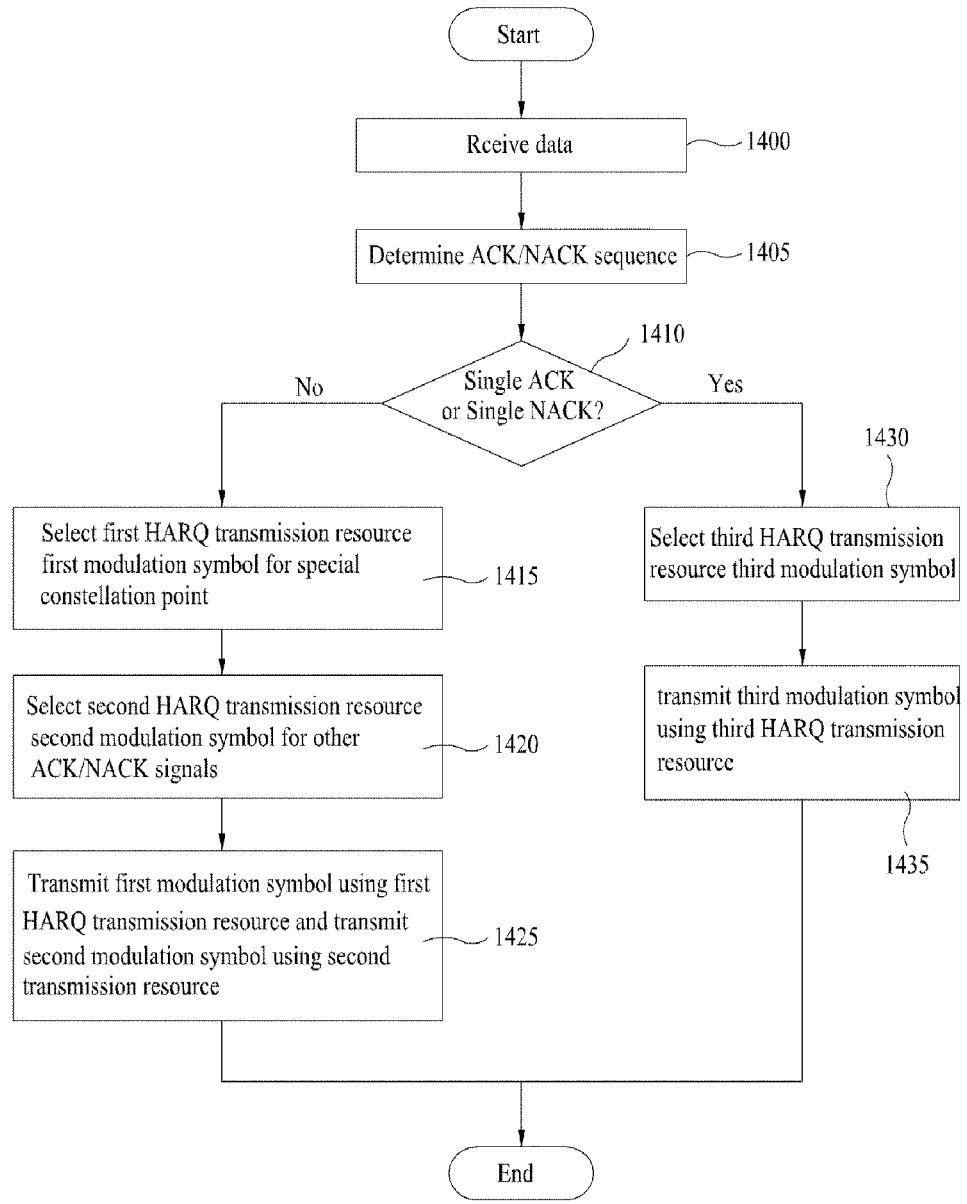
FIG. 14 is a flow chart illustrating a method for transmitting ACK/NACK sequence using a method of multiplexing ACK/NACK according to another embodiment of the present invention.

FIG. 14 is a flow chart illustrating a method for transmitting ACK/NACK sequence using a method of multiplexing ACK/NACK according to another embodiment of the present invention.

Referring to FIG. 14, the receiver receives a plurality of data from the transmitter in step 1400. The receiver decodes the data and determines whether a decoding process of each data has been successfully performed, whereby the receiver determines ACK/NACK sequence that includes ACKs/NACKs corresponding to each data, in step 1405.

Subsequently, in step 1410, the receiver determines whether the ACK/NACK sequence includes only one ACK or only one NACK, preferably only one NACK split from DTX signal.

If the ACK/NACK sequence includes only one ACK or only one NACK split from DTX signal, i.e., if the ACK/NACK sequence includes at least two ACKs, the receiver selects a first HARQ transmission resource for indicating location of a certain ACK included in the ACK/NACK sequence and a first modulation symbol corresponding to the first HARQ transmission resource in step 1415. Namely, the receiver selects a combination of the first HARQ transmission resource and the first modulation symbol. Also, the receiver selects a second HARQ transmission resource for indicating information of type and order of ACKs/NACKs other than the certain ACK in the ACK/NACK sequence and a second modulation symbol corresponding to the second HARQ transmission resource in step 1420. Namely, the receiver selects a combination of the second HARQ transmission resource and the second modulation symbol.

In step 1425, the receiver transmits the first modulation symbol to the transmitter using the first HARQ transmission resource, and also transmits the second modulation symbol to the transmitter using the second HARQ transmission resource.

In step 1410, it is determined that the ACK/NACK sequence includes only one ACK or only one NACK split from DTX signal, the receiver selects a third HARQ transmission resource corresponding to the ACK/NACK sequence and a third modulation symbol corresponding to the third HARQ transmission resource in step 1430. Namely, the receiver selects a combination of the third HARQ transmission resource and the third modulation symbol. Also, in step 1435, the receiver transmits the third modulation symbol to the transmitter using the third HARQ transmission resource.

In the aforementioned embodiments of the present invention, although similar ACK/NACK sequences are allocated to the same modulation symbol in each HARQ transmission resource, this is only exemplary for convenience of description. It will be apparent to those skilled in that art that various modifications can be made in the embodiments of the present invention.

Figure 15:
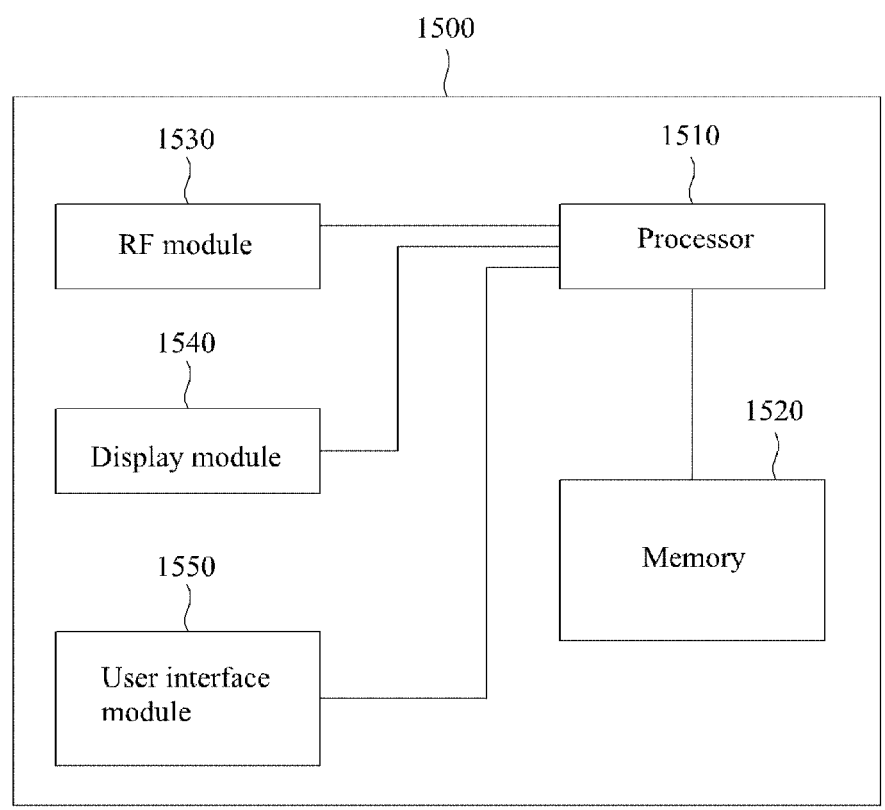
FIG. 15 is a block diagram illustrating a transceiver according to one embodiment of the present invention.

FIG. 15 is a block diagram illustrating a transceiver according to one embodiment of the present invention. The transceiver could be a part of the base station or the user equipment.

Referring to FIG. 15, the transceiver 1500 includes a processor 1510, a memory 1520, an RF module 1530, a display module 1540, and a user interface module 1550.

The transceiver 1500 is illustrated for convenience of description, and some modules of the transceiver 1500 may be omitted. Also, the transceiver 1500 may further include required modules. Furthermore, some modules of the transceiver 1500 may be divided into segmented modules. The processor 1510 is configured to perform the operation according to the embodiment of the present invention, which is illustrated with reference to the accompanying drawings.

In detail, when the transceiver 1500 is a part of the base station, the processor 1510 can generate a control signal and map the control signal to a control channel established within a plurality of frequency blocks. Also, when the transceiver 1500 is a part of the user equipment, the processor 1510 can identify a control channel indicated thereto from a signal received from a plurality of frequency blocks and extract a control signal from the control channel.

Afterwards, the processor 1510 can perform a required operation based on the control signal. For the detailed operation of the processor 1510, refer to the description of FIG. 1 to FIG. 13.

The memory 1520 is connected with the processor 1510 and stores operating system, application, program code, data, etc. therein. The RF module 1530 is connected with the processor 1510 and converts a baseband signal to a radio signal or vice versa. To this end, the RF module 1530 performs analog conversion, amplification, filtering, frequency unlink conversion or their reverse procedures. The display module 1540 is connected with the processor 1510, and displays various kinds of information. Examples of the display module 1540 include, but not limited to, LCD (Liquid Crystal Display), LED (Light Emitting Diode), and OLED (Organic Light Emitting Diode). The user interface module 1550 is connected with the processor 1510, and can be configured by combination of well known user interfaces such as key pad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method and apparatus for transmitting ACK/NACK sequence information corresponding to a plurality of data in a wireless communication system.

The invention claimed is:

1. A method for transmitting information of ACK/NACK (Acknowledgement/Negative ACK) sequence at a receiver in a wireless communication system, the method comprising:
receiving a plurality of data from a transmitter;
determining one ACK/NACK sequence including ACKs/NACKs corresponding to each of the plurality of data;
if two or more ACKs are included in the ACK/NACK sequence, selecting a combination of a first HARQ (Hybrid Automatic Repeat reQuest) transmission resource and a first modulation symbol corresponding to a certain ACK of the two or more ACKs, and selecting a combination of a second HARQ transmission resource and a second modulation symbol corresponding to ACKs other than the certain ACK of the two or more ACKs; and
transmitting each of the first modulation symbol and the second modulation symbol to the transmitter using the first HARQ transmission resource and the second HARQ transmission resource, respectively.

2. The method of claim 1, wherein the combination of the first HARQ transmission resource and the first modulation symbol includes information of location of the certain ACK in the ACK/NACK sequence.

3. The method of claim 1, wherein the combination of the second HARQ transmission resource and the second modulation symbol includes information of location and the number of the ACKs other than the certain ACK in the ACK/NACK sequence.

4. The method of claim 1, further comprising:
if only one ACK is included in the ACK/NACK sequence, selecting a combination of a third HARQ transmission resource and a third modulation symbol corresponding to the one ACK; and
transmitting the third modulation symbol to the transmitter using the third HARQ transmission resource,
wherein the third modulation symbol is different from the first modulation symbol and the second modulation symbol.

5. The method of claim 4, wherein the combination of the third HARQ transmission resource and the third modulation symbol includes information of location of the one ACK in the ACK/NACK sequence.

6. A method for transmitting information of ACK/NACK sequence, which includes ACKs/NACKs, from a receiver in a wireless communication system, the method comprising:
selecting a combination of a first HARQ (Hybrid Automatic Repeat reQuest) transmission resource and a first modulation symbol and a combination of a second HARQ transmission resource and a second modulation symbol, corresponding to the ACK/NACK sequence; and
transmitting each of the first modulation symbol and the second modulation symbol to a transmitter using the first HARQ transmission resource and the second HARQ transmission resource, respectively.

7. A receiving apparatus in a wireless communication system comprising:
a receiving module receiving a plurality of data from a transmitting apparatus;
a processor determining one ACK/NACK sequence, which includes ACKs/NACKs corresponding to the plurality of data, if two or more ACKs are included in the ACK/NACK sequence, selecting a combination of a first HARQ (Hybrid Automatic Repeat reQuest) transmission resource and a first modulation symbol corresponding to a certain ACK of the two or more ACKs, and selecting a combination of a second HARQ transmission resource and a second modulation symbol corresponding to the ACKs other than the certain ACK of the two or more ACKs; and
a transmitting module transmitting each of the first modulation symbol and the second modulation symbol to the transmitting device using the first HARQ transmission resource and the second HARQ transmission resource, respectively.

8. The receiving apparatus of claim 7, wherein the combination of the first HARQ transmission resource and the first modulation symbol includes information of location of the certain ACK in the ACK/NACK sequence.

9. The receiving apparatus of claim 7, wherein the combination of the second HARQ transmission resource and the second modulation symbol includes information of location and the number of the ACKs other than the certain ACK in the ACK/NACK sequence.

10. The receiving apparatus of claim 7,
wherein the processor, if only one ACK is included in the ACK/NACK sequence, selects combination of a third HARQ transmission resource and a third modulation symbol corresponding to the ACK/NACK sequence,
wherein the transmitting module transmits the third modulation symbol to a transmitter using the third HARQ transmission resource, the third modulation symbol being different from the first modulation symbol and the second modulation symbol.

11. The receiving apparatus of claim 10, wherein the combination of the third HARQ transmission resource and the third modulation symbol includes information of location of the one ACK in the ACK/NACK sequence.

* * * * *